Aug. 13, 1935.  J. MIHALYI  2,011,342

MOTION PICTURE PULL-DOWN AND SHUTTER MECHANISM

Filed March 1, 1932   2 Sheets-Sheet 1

Inventor:
Joseph Mihalyi,

Attorneys.

Aug. 13, 1935.  J. MIHALYI  2,011,342
MOTION PICTURE PULL-DOWN AND SHUTTER MECHANISM
Filed March 1, 1932  2 Sheets-Sheet 2

Inventor:
Joseph Mihalyi,
By
Attorneys

Patented Aug. 13, 1935

2,011,342

UNITED STATES PATENT OFFICE 2,011,342

MOTION PICTURE PULL DOWN AND SHUTTER MECHANISM

Joseph Mihalyi, Rochester, N. Y., assignor to Eastman Kodak Company, Rochester, N. Y., a corporation of New York Application March 1, 1932, Serial No. 595,981

12 Claims. (Cl. 88—18.4)

This invention relates to photography and more particularly to motion picture apparatus. One object of my invention is to provide a motion picture machine with a pull-down and shutter which will always operate in the proper timed relation from a single power driven element. Another object of my invention is to provide a simple and relatively inexpensive pull-down and shutter mechanism which can be readily assembled. Another object of my invention is to provide a motion picture machine with a pull-down mechanism adapted to move through a fixed path and to be moved through the path with a predetermined acceleration by means of a cam and cam follower. Another object of my invention is to operate a motion picture shutter through a cam and cam follower. Still another object of my invention is to provide a single driven member for engaging cams on both the pull down and the shutter mechanisms and other objects will appear from the following specification, the novel features being pointed out in the claims at the end thereof.

Coming now to the drawings wherein like reference characters denote like parts throughout:

Figure 1:
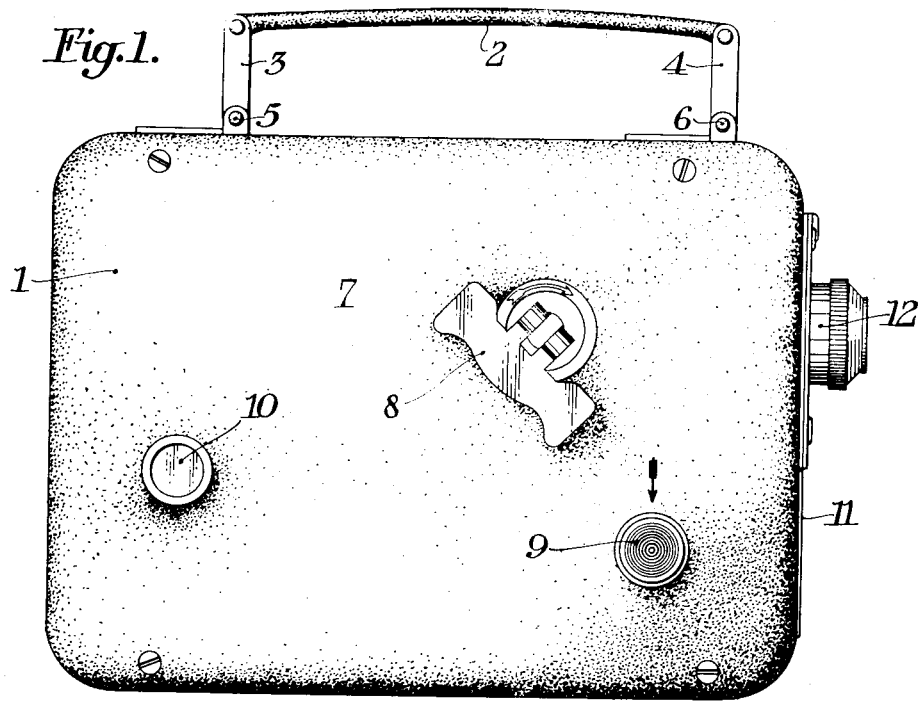
Fig. 1 shows a side elevation of a motion picture machine here shown as a camera constructed in accordance with and embodying a preferred form of my invention.
Figure 2:
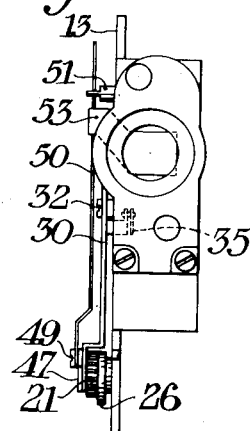
Fig. 2 is a fragmentary front elevation of the mechanism plate removed from the camera.

While it is obvious that certain features of my invention are equally useful for cameras and projectors, I have shown as a preferred embodiment of my invention the shutter and pull-down structures as applied to a simple type of motion picture camera. As will appear from Fig. 1, the camera may consist of a housing 1 which may be carried by the usual handle 2 attached to links 3 and 4 which are pivoted at 5 and 6 to the camera body. The side wall 7 of the camera is provided with a winding key 8 with which the spring motor carried by the camera may be placed under tension, with a release button 9 and with a window 10 through which a footage indicator may be viewed.

On the front wall 11 of the camera there is the usual type of objective mounted in a lens barrel 12.

In order to operate the camera, the handle 8 is turned placing the spring enclosed behind a mechanism plate 13 under tension. Only a portion of the spring housing is shown at 14 in Fig. 5. A ratchet wheel 15 and a pawl 16 are employed to retain the spring against rearward movement during winding and the large gear 17 is permanently attached to the movable housing plate 14 which may be turned by a spring.

Gear 17 meshes with a pinion 18 carried on the shaft 19 which also supports the gear 20. Gear 20, in turn, meshes with the pinion 21 which carries an eccentric stud 22.

In order to release the motor so that it may actuate the above-described parts, there is a slide 23 carrying a slot 24 which is engaged with a post extending inwardly from the push button 9. When it is desired to operate the motor, the push button 9 is thrust downwardly in the direction shown by the arrow, this movement carrying with the slidable member 23 a latch member 25. As will be seen from Figs. 5 and 6, the latch member 25 is adapted to lie in the path of the eccentric lug 26 carried by the gear 21. To stop the camera, the push button 9 is allowed to move in a direction opposite to that shown by the arrow under the impulse of a spring 27 which tends to hold the slide 23 in a raised position in which the motor is held against movement.

Figure 3:
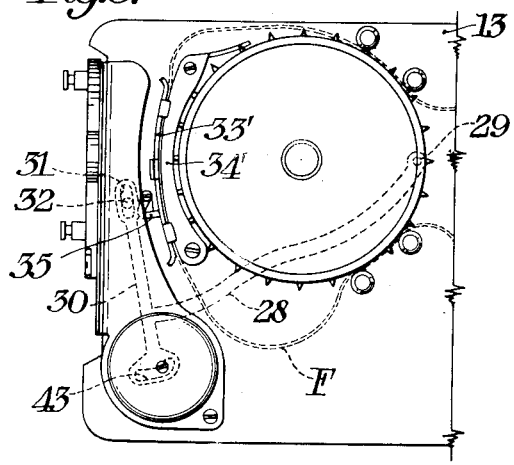
Fig. 3 is a fragmentary detail side elevation of the mechanism plate shown in Fig. 2.

The shutter mechanism consists of an L-shaped lever as best shown in Fig. 3; this lever designated broadly as 28 being pivoted at 29 to the mechanism plate 13 and having an end 30 slotted at 31 so that it may slide freely upon a pin 32.

Figure 4:
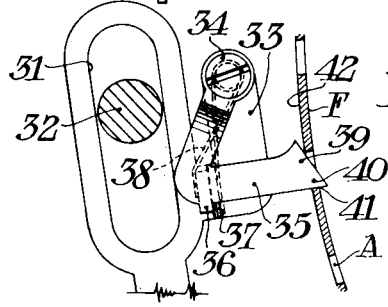
Fig. 4 is an enlarged fragmentary detail showing the pull-down claw and its connection with its supporting arm.

It should be noted that the pivotal point 29 of lever 28 is substantially on the radius of the gate 33'—34', the film F passing between these two gate members through an arcuate path. It will thus be seen that the end of lever 30 which slides about the pin 32 follows substantially the same curve as the gate. This end also carries a portion 33, which is bent to pass through the mechanism plate 13 and 33 carries a stud 34 on which the pull-down claw 35 is mounted. This claw carries a lug 36 adapted to strike the abutment 37 to limit its movement toward the film F under the impulse of a spring 38. This spring always holds the claw in engagement with the film and, as also shown in Fig. 4, the width of the claw at its film-engaging portion 39 is greater than the width of a film aperture A so that the claw cannot pass through the aperture but always engages one side of the film.

In its downward stroke the film portion 40 of the claw engages one edge 41 of the film and moves the film downwardly as the lever 28 is moved but on its return movement the claw moves against the action of spring 38 and rides over the back surface 42 of the film during its downward movement. This is what is sometimes known as a latch type of claw.

Figure 7:
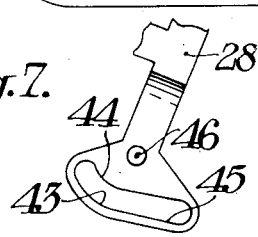

In order to oscillate lever 28 to move the claw up and down the eccentric stud 22 carried by gear 21 extends up through a cam slot 43 best shown in Fig. 7. This cam slot has a curved portion 44 and a straight portion 45 so that the movement of the arm 28 is not uniform but an acceleration is obtained during one portion of the stroke. The shape of the cam formed by slot 44—45 is such that the downward movement of the claw is somewhat more rapid than the upward movement thereof so that the film remains stationary during a longer period of time than the time consumed in moving the film.

Figure 5:
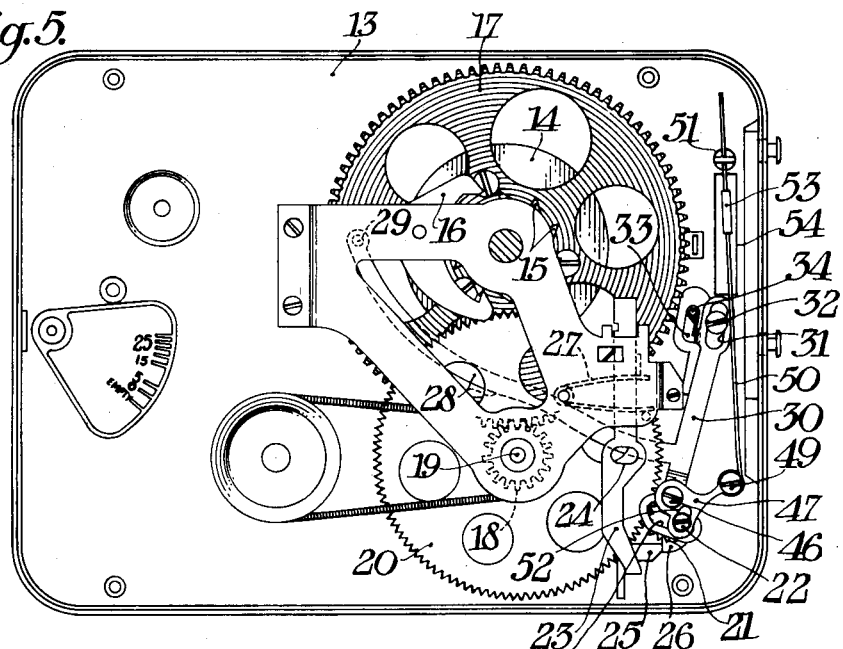
Fig. 5 is a side elevation of the camera with one side removed showing the gearing connecting the power drive to the pull-down mechanism and shutter.
Figure 6:
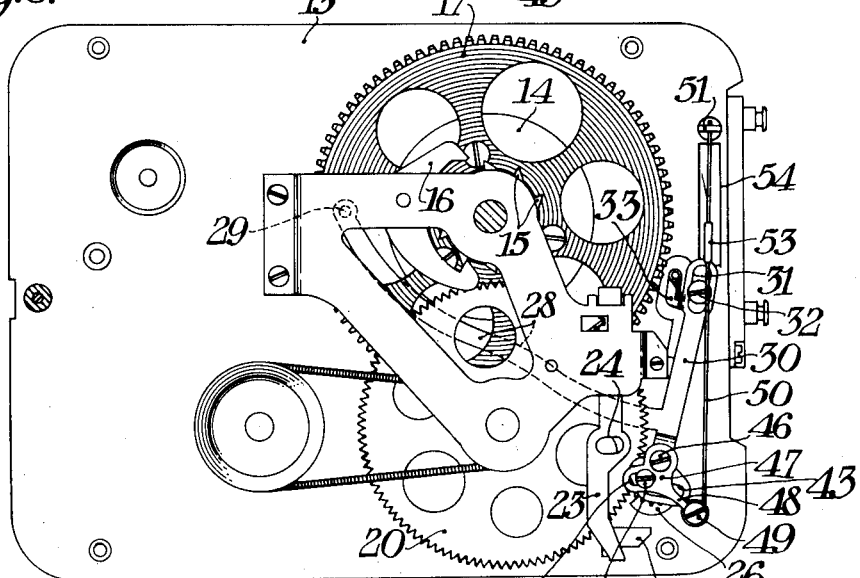
Fig. 6 is a view similar to Fig. 5 but with the parts in a different position and Fig. 7 is an enlarged fragmentary view of the cam carried by the claw-operating arm.

In order to coordinate a shutter with the pulldown mechanism in such a way that there will be no possibility of incorrect assembling I mount directly on the L-shaped lever 28 a stud 46. On this stud, as best shown in Figs. 5 and 6, there is mounted a small lever 47 having one arm 48 terminating in a pivot 49 to which there is attached a slidable rod 50.

Rod 50 is mounted to slide freely in a bearing 51 at its upper end and the lever 47 is provided with a cam slot 52 by which the lever is oscillated to operate the shutter plate 53 which is attached to the rod 50 and which may move freely through a slot 54 in the mechanism plate 13.

The slot 52 in lever 47 is a straight slot and it engages the eccentric pin 22 which also moves the cam operating the pull-down mechanism. Thus the shutter operating lever 47 is pivoted to the pull-down carrying lever and is operated by the same eccentric stud. This greatly simplifies the assembling operations and it is not necessary to adjust the shutter to operate in timed relation with the pull-down claw.

The effect of pivoting the lever 47 to the L-shaped lever 28 and the effect of operating it by the same eccentric stud is that the shutter covers the exposure aperture during the time the film is moving and uncovers the aperture for exposure during the time the film remains stationary. The cam slot 52 and the arm 48 of the lever 47 are arranged so that the shutter is moved downwardly during the time the claw is moving in a reverse direction, and as the shutter descends, the claw is moving over the film in an upward direction, and when it engages another perforation and starts its downward movement, the shutter has again covered the exposure aperture.

It will be noted that this structure is an inexpensive one since only four gears are required between the power spring and the eccentric stud 22 which operates both the pull-down and shutter mechanism. These gears are all of a simple type and no bevel or spiral gears are required.

What I claim as my invention and desire to be secured by Letters Patent of the United States is:

1. In a motion picture machine having an objective and a gate for locating a film in the focal plane thereof, the combination with a pulldown mechanism for the film including a film engaging claw and an oscillating lever carrying said claw, of a shutter mounted directly on said oscillating lever and consisting of a single light obscuring element, whereby said pulldown claw and shutter can only operate in timed relation.

2. In a motion picture machine having an objective and a gate for locating a film in the focal plane thereof, the combination with a pulldown mechanism for the film including a film engaging claw and an oscillating lever carrying said claw, of a shutter movably mounted on said oscillating lever and consisting of a single light obscuring element, and means for oscillating said lever including a member moving through a fixed path.

3. In a motion picture machine having an objective and a gate for locating a film in the focal plane thereof, the combination with a pull down mechanism for the film including a film engaging claw and an oscillating lever carrying said claw, of a shutter pivotally mounted on said oscillating lever, and means for oscillating said lever including a member moving through a fixed path, said means contacting with and being adapted to move said shutter upon its pivotal mounting.

4. In a motion picture machine having an objective and a gate for locating a film in the focal plane thereof, the combination with a pulldown mechanism for the film including a film engaging claw and an oscillating lever carrying said claw, of a shutter pivotally mounted on said oscillating lever, and means for oscillating said lever including a member moving through a fixed path and having operative engagement with said lever, said member also having operative engagement with said shutter being adapted to move said shutter upon its pivotal mounting on said oscillating lever.

5. In a motion picture machine having an objective and a gate for positioning a film in the focal plane thereof, the combination with a pulldown mechanism for intermittently advancing film through the gate, said pulldown mechanism comprising a pivoted arm and means for oscillating the arm upon its pivot including an eccentric, a power drive for the eccentric, a cam carried by the oscillating arm engaging said eccentric, a shutter and means for moving the shutter including a movable member movably mounted on the arm and including a cam as a part of the movably mounted member also contacting with said eccentric whereby differential movement is transmitted by the eccentric to the pulldown and shutter in a predetermined time relation.

6. In a motion picture machine having an objective and a gate for locating the film in the focal plane of the objective, the combination with a pull down and shutter, of means for operating the pull down and shutter including a source of power and an eccentric driven thereby, said shutter including a movable member having a cam slot therein, said pull down including a pivoted member including a cam slot and pivotally supporting said shutter, said eccentric directly engaging the cam slots of both members to drive them in timed relation.

7. In a motion picture machine having an objective and a gate for locating the film in the focal plane of the objective, the combination with a pull down and shutter, independent pivotal supports for the pulldown and shutter, the pivotal support for the shutter being carried by the pulldown, of means for operating the pull down and shutter including a source of power, and an eccentric driven thereby, said pull down and shutter mechanism each including a cam slot, both of said cam slots engaging said eccentric.

8. In a motion picture machine having an objective and a gate for locating film in the focal plane of the objective, the combination with a shutter and pull down mechanism, of a source of power, an eccentric driven by said source of power, said pull down mechanism including a lever pivoted to the camera and having a spring latch carried thereby for engaging the film, said lever including also a cam slot engaging the eccentric, said shutter comprising a slidably mounted arm carrying the shutter member, and means, pivoted on the pull down lever and pivoted to the slidably mounted arm for operating the shutter in timed relation to the pull down.

9. In a motion picture machine having an objective and a gate for locating film in the focal plane of the objective, the combination with a shutter and pull down mechanism, of a source of power, an eccentric driven by said source of power, said pull down mechanism including a lever pivoted to the camera and having a spring latch carried thereby for engaging the film, said lever including also a cam slot engaging the eccentric, said shutter comprising a slidably mounted arm carrying the shutter member, and means pivoted on the pull down lever and pivoted to the slidably mounted arm for operating the shutter in timed relation to the pull down, said means being directly engaged by said eccentric.

10. In a motion picture machine having an objective and a gate for locating film fixedly with respect to the objective, the combination with a pulldown and a shutter, of means for operating the pulldown and shutter including a source of power, and an eccentric driven thereby, said pulldown comprising an L-shaped slotted lever, a pivotal support for the L-shaped lever carried by the machine, said lever slot engaging said eccentric, said shutter comprising a blade member adapted to move to and from a position behind the objective, an arm carrying said blade member, said arm being pivotally mounted upon said L-shaped lever.

11. In a motion picture machine having an objective and a gate for locating the film fixedly with respect to the objective, the combination with a pulldown and shutter, of means for operating the pulldown and shutter including a source of power and an eccentric driven thereby, said pulldown comprising an L-shaped slotted lever pivotally attached to the machine and having its slot engaging said eccentric, said shutter comprising a blade member, an arm carrying said blade member pivotally to said L-shaped member through a bell crank lever, said bell crank lever including a cam slot engaging said eccentric whereby said shutter may be oscillated behind the objective in timed relation to the pulldown mechanism but with an accelerated movement with respect thereto.

12. In a motion picture machine having an objective and a curved gate for locating film fixedly with respect to the objective, the combination with a pulldown and shutter, of means for operating the pulldown and shutter including a source of power and a single eccentric driven thereby, said pulldown comprising an L-shaped slotted lever, a pivotal support for the L-shaped lever carried by the machine and substantially on the radius of said curved gate, the slot of said lever engaging said eccentric, said shutter comprising a blade adapted to move behind the objective, a bell crank lever carried by said L-shaped lever having one arm connected to said shutter arm and including a slot in the other arm of the bell crank lever, said slot engaging the eccentric which drives the L-shaped member.

JOSEPH MIHALYI.